Sept. 13, 1932.　　　　C. MacLEOD　　　　1,876,992
PATTERN TURNING LATHE
Filed Feb. 6, 1930　　　2 Sheets-Sheet 1
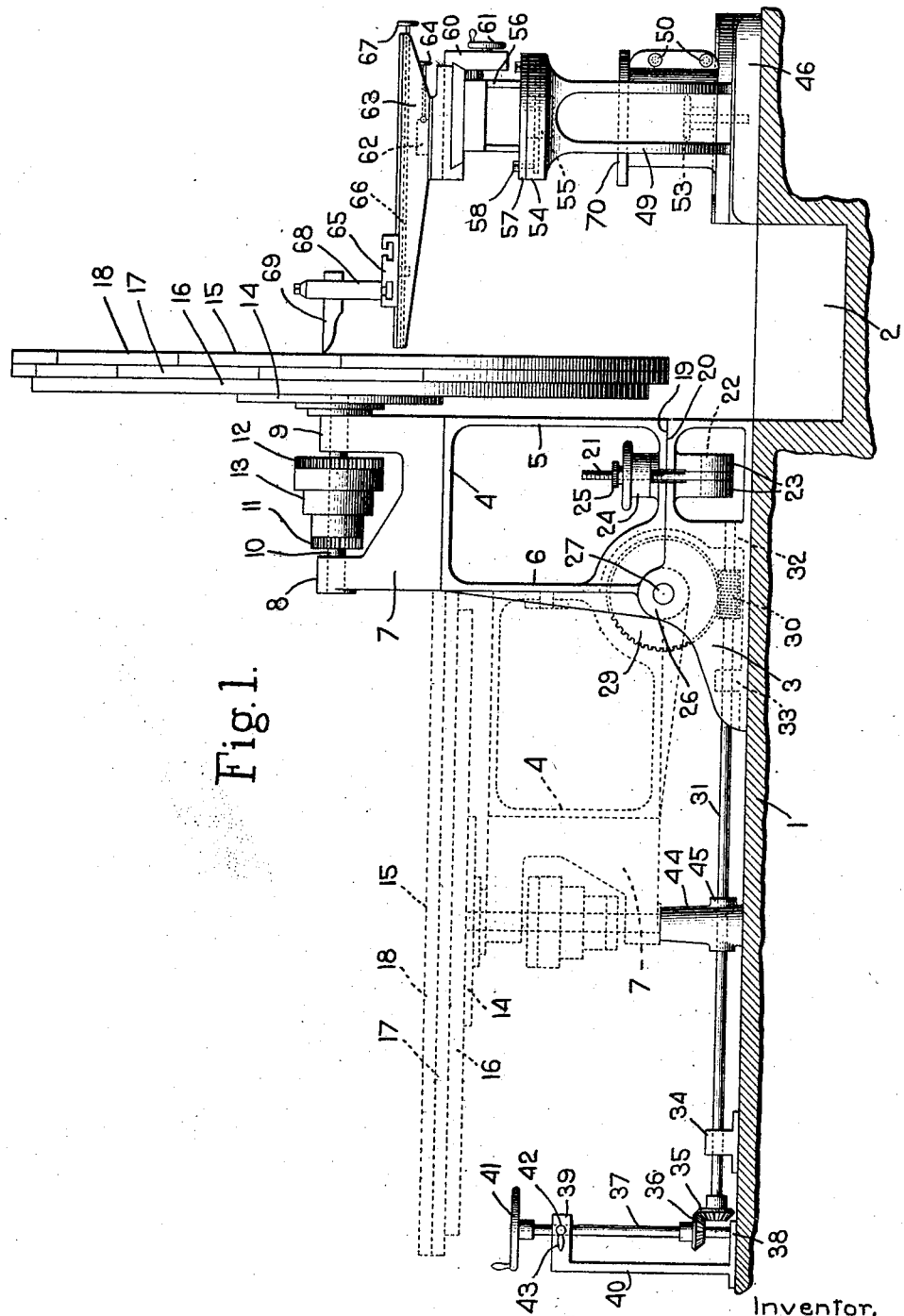

Sept. 13, 1932.  C. MacLEOD  1,876,992
PATTERN TURNING LATHE
Filed Feb. 6, 1930   2 Sheets-Sheet 2
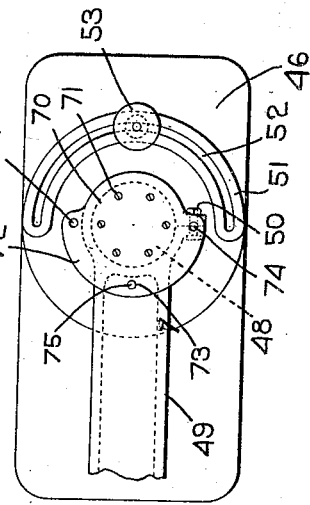
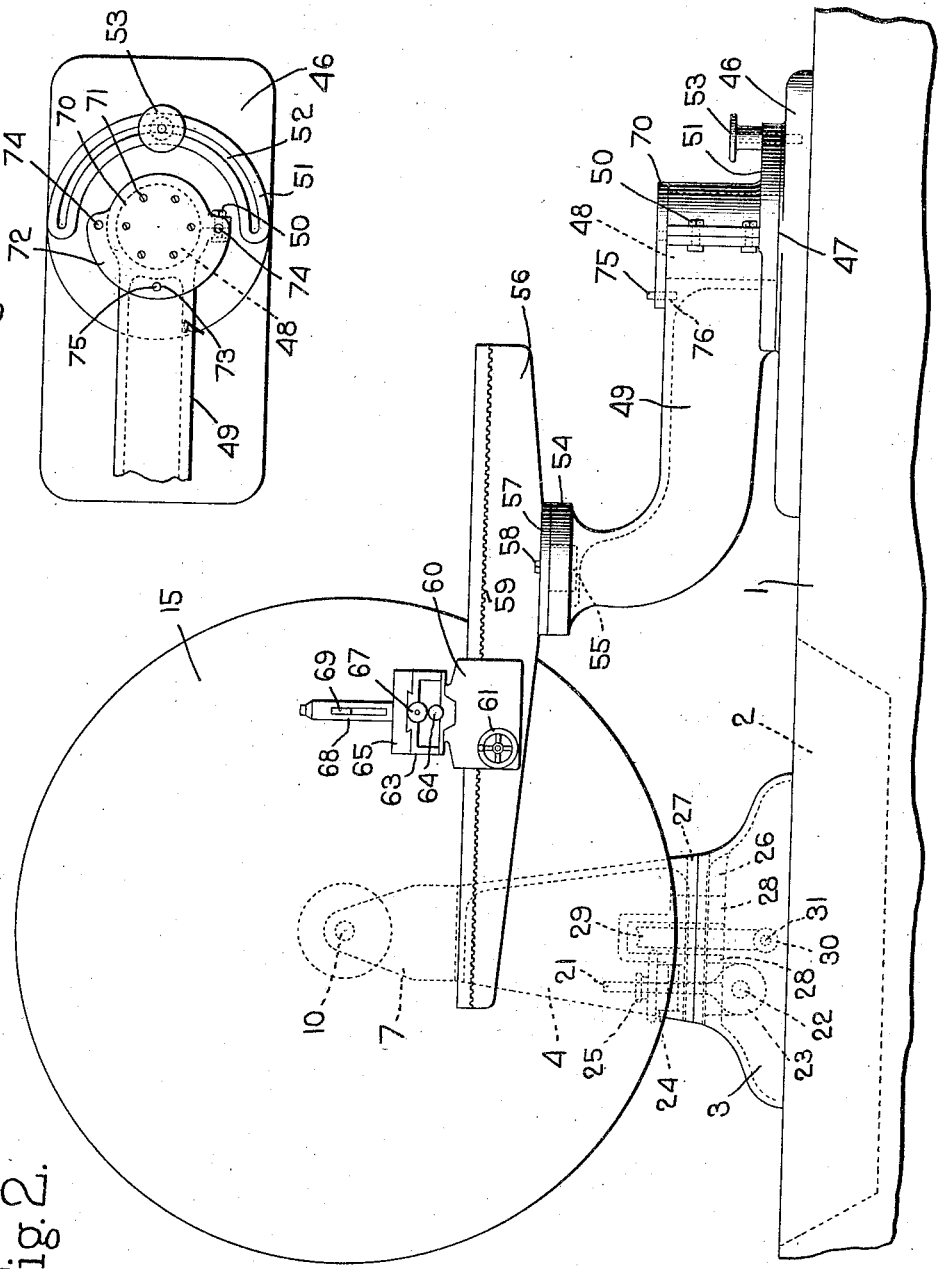
Inventor.
Charles MacLeod
by Heard Smith & Tennant
Attys.

Patented Sept. 13, 1932

1,876,992

UNITED STATES PATENT OFFICE

CHARLES MacLEOD, OF NORTH EASTON, MASSACHUSETTS

PATTERN TURNING LATHE

Application filed February 6, 1930. Serial No. 426,217.

This invention relates to improvements in pattern turning lathes particularly lathe constructions for turning large wooden patterns, and the general object of the invention is to improve the efficiency of a lathe and also to increase the capacity thereof, and further to enable operations to be performed upon the lathe which heretofore have not been possible.

In recent years the size of work required to be turned in pattern turning lathes has been progressively increasing and particularly with respect to wooden patterns employed in the manufacture of castings of large diameter and size in which the pattern is made of several courses which are successively faced in the lathe.

The usual method of manufacturing a pattern of large size, such, for example, as eight feet in outside diameter with a thickness of twelve inches or more, is to construct the same in courses of segments, with the segments of the successive courses overlapped in a manner similar to those of bricks in a wall. In making such constructions a flat base of approximately the diameter of the pattern is secured to the face plate of the lathe in effect forming a supplemental face plate. The course of segments is then secured to this base and the work placed in the lathe by securing the face plate to the driving shaft of the headstock.

The work is then rotated in a vertical plane and the surface of the segments faced off by the lathe tool to make a true surface for the next layer and the edge trued in such a manner as properly to balance the work. The face plate and work are then detached from the lathe by the several workmen, placed back upon the support and another course of segments located in staggered relation to those previously assembled applied and glued thereto and the work again transferred to the lathe and the operation repeated until the required number of courses have been applied. Obviously as the work becomes heavier with each layer of segments more men are required to transport it to and from the lathe, thereby substantially increasing the cost of manufacture.

This method although unhandy and requiring extra labor is the most accurate way of building up a large pattern in such a manner that when the last layer of segments has been applied the pattern is true "in the rough" and ready to be turned to finished dimensions for the reason that by re-facing each course in the lathe the pattern maker has an opportunity to true off any projection of the segments that may be out of line and to insure the tightness of the joints.

One of the objects of the present invention is to eliminate, as far as possible, the extra labor required to increase the speed of construction and to save floor space required for the assembling of the segments of the work upon the face plate of the lathe.

This is accomplished in the present invention by providing means which will permit the face plate, or other work support, to be moved from the normal vertical position, in which the turning operation is performed, to a substantially horizontal position in which the courses of segments may be successively built up without removal of the face plate or the work from the lathe and which will permit each course as it is applied to be restored to vertical position for facing or such other turning operation as may be required. This is accomplished by providing a lathe comprising a column, an operative member of the lathe pivotally mounted to swing about an axis remote from the vertical axis of said column in such a manner as to remove the operative member from its normal position, or, more specifically stated, to provide a lathe comprising a column, a headstock carried thereby having a shaft provided with a work support normally rotatable in a vertical plane with means pivotally connecting the headstock to the column in such a manner as to permit the face plate to be moved to a substantially horizontal position.

A further object of the invention is to provide a pattern turning lathe comprising a headstock having a rotatable shaft provided with work-supporting means and means normally supporting the headstock with the shaft thereof in horizontal position with mechanically operable, power-multiplying means for swinging the headstock about a horizontal axis to position the shaft in angular relation to the horizontal.

A further object of the invention is to provide means for locking the headstock in a desired angularly adjusted position, thereby enabling other operations, such as drilling or routing by an overhead radial drill to be performed while the work is retained in horizontal or angular positions upon the work support of the lathe.

In turning large pieces of work it has heretofore been customary to guide the tool by hand upon a movable rest or floor stand. It is, however, quite impossible to hold the chisel, or other tool, steady upon such a rest which is frequently itself unsteady. Furthermore, by reason of the increased speed of movement of the work toward its periphery the factor of safety in handling such a tool is progressively decreased.

Another object of the invention is to provide mechanism for positively supporting the tool in such a manner that it may be presented to any part of the work. This is accomplished by providing a compound tool-supporting mechanism in which the tool slide is reciprocably mounted upon a cross slide support which in turn is swiveled upon a main carriage mounted upon a suitable carriage slide which is in turn swiveled upon a section of a pedestal which is itself swiveled upon a base section, thus enabling the tool to be presented and moved in a horizontal plane in any direction relatively to the work.

Where large pieces of work are supported by the headstock of the lathe, which is so mounted that the work can be swung from a normal vertical operative position to a horizontal position or other position inclined with respect to the vertical, it is desirable that means shall be provided by which the tool support may be moved out of the path of the work as it is swung from vertical to inclined or horizontal position. This is accomplished in the present invention by so constructing and proportioning the pivotally connected members of the tailstock pedestal and the carriage slide as to permit the carriage slide and the tool slide, which is supported thereby, to be swung out of the path through which the work moves as it is swung from vertical to inclined or horizontal position.

A further object of the invention is to provide a lathe construction in which work, having a greater radius than the distance from the bottom of the headstock column to the axis of the work-supporting shaft, may be turned and which preferably also permits the work to be swung from vertical to inclined or horizontal position as above described. This is accomplished by mounting the headstock column and the tool-supporting pedestal upon a suitable base having a pit located beneath the face plate, or other work support carried by the headstock, and suitably proportioning the pivotally connected members of the tool-supporting pedestal and carriage slide to permit the same and the tool carried thereby to be swung out of the path of the work.

A further object of the invention is to provide means respectively operable to clamp the respective adjustable members in normal and adjusted positions.

These and other objects and features of the invention will more fully appear from the following description and the accompanying drawings and will be particularly pointed out in the claims.

In the drawings:

Fig. 1 is a side elevation of a lathe embodying the invention mounted upon a base, which is shown in vertical section, and illustrating in full and dotted lines respectively the mechanisms positioning the work in vertical and horizontal position;

Fig. 2 is a front elevation viewed toward the work which is supported upon the face plate; and, Fig. 3 is a detail view illustrating a preferred means for clamping the lower and pivotally mounted sections of the pedestal in adjusted positions.

The pattern turning lathe construction illustrated in the drawings comprises a base 1, which may be of concrete, metal, or any other suitable material, having beneath the normal operative position of the work a recess or pit 2 of sufficient depth to permit the turning of work of larger size than the capacity of the lathe would otherwise permit. The lathe proper comprises a headstock column having a short base section 3 which is suitably secured to the base and preferably in proximity to the pit 2, and a relatively long upper section 4 which desirably may be of skeleton form having a front wall 5 and a rear wall 6 and provided with a headstock 7 which may be integral with or secured to the upper section 4 of the column.

The headstock 7 is provided with bosses 8 and 9 which provide journals for the normally horizontal work shaft 10. The shaft 10 may have secured to it suitable gears 11 and 12 of different diameters, or a cone pulley 13, or both, through which rotation may be transmitted to the shaft 10 from a suitable source of power. The shaft 10 is provided with a face plate 14 upon which the work is mounted. As illustrated in the accompanying drawings the work 15 is removably secured to a base 16 of a diameter approximating that of the work. The base 16 is detachably secured to the usual face plate 14 and constitutes in effect a detachable face plate which supports the work. The work 15 in large patterns comprises courses 17 and 18 glued, or otherwise secured together, with the sections in overlapping or staggered relation.

Means are provided for permitting the work to be swung from normal vertical position to horizontal position or in intermediate angular inclination. In the particular construction shown the lower end of the upper column section 4 is provided with a flat surface 19 which rests upon a complementary flat surface 20 of the lower section and is detachably secured thereto by an eye-bolt 21 the lower end or eye of which is mounted upon a shaft 22 in bosses 23 extending downwardly from a web at the upper end of the lower section into a recess in the lower section. The contracting webs of the lower and upper column sections are slotted to permit the eye-bolt 21 to be swung into and out of locking position illustrated in Fig. 1. The sections are locked in normal position by a large nut 24 on the screw 21 having a peripheral rim affording a hand grip. Desirably a suitable lock nut 25 is provided to prevent loosening of the nut 24 by the vibration of the headstock.

The lower section of the column is provided with upwardly extending bosses 26 which provide bearings for a horizontal shaft 27 which preferably extends at right angles to the vertical plane of the shaft 10. The wall 6 of the upper section 4 of the column is provided with one or more downwardly extending bosses 28 which lie intermediate of the bosses 26 and keyed, or otherwise secured, to the horizontal shaft 27. By reason of this construction the upper section of the column may be rotated about the axis of the horizontal shaft 27 after the shaft 10 is disconnected from its driving means thereby to move the work from vertical to horizontal or angular position as above described.

By providing a short lower column section and a relatively long upper column section the face plate, when swung to horizontal position, may be supported at a convenient height to permit the progressive assembling of the parts of the pattern thereupon, as above described. Furthermore, the face plate, when in horizontal position, is freely rotatable, thereby greatly facilitating the assembling of the parts of the pattern thereupon it.

Inasmuch as the mechanism and the work may be of very considerable weight, power-multiplying or power-operated means desirably are provided for swinging the upper section of the headstock column and the work carried thereby about said pivotal axis. In the present construction a gear, preferably a worm gear 29 is keyed, or otherwise fixedly secured, to the shaft 27 and is engaged by a worm 30 upon a shaft 31 one end of which is mounted in suitable bearings 32 and 33 in the lower section of the column 3, and also may be journalled in other bearings 34 external to the column. The shaft 31 may be rotated in any suitable manner, either by hand or by power, to cause the rotation of the gear 29 and thereby the rotation of the upper section of the column, which is also secured to the shaft 27, to and from normal vertical position.

In the particular construction illustrated the shaft 31 is provided at its remote end with a beveled gear 35 which is engaged by a complementary beveled gear 36 upon a shaft 37 secured in suitable bearings in the base 38 and an overhanging arm 39 of a pedestal 40 which rests upon and is secured to the base 1. The shaft 39 is provided at its upper end with a hand wheel 41 which when rotated will cause the shaft 37 through the beveled gears 36 and 35 to rotate the shaft 31, worm 30, worm gear 29, and thereby to swing the upper section of the column about the axis of the horizontal shaft 27.

Means may be provided for locking the upper section of the headstock column in any desired position. In the present construction the ratio between the worm and the worm gear and the pitch of the complementary threads thereupon is such that the weight of the column and work will have very little tendency to rotate the shaft 31, so that the column and its headstock may be arrested in any desired position. Means, however, may be provided for positively locking the same at any desired position. As illustrated herein such means comprises a screw 42 seated in the overhanging arm 39 of the pedestal 40 and positioned to engage the shaft 37, the screw 42 being provided with a handle 43 by means of which it can be conveniently manipulated and which will enable sufficient power to be applied to the screw firmly to clamp the shaft 37 against rotation.

Other means are desirably employed for supporting the headstock with its shaft 10 in substantially vertical position. A simple device for accomplishing this purpose, which is illustrated herein, comprises a post 44 which rests upon or is secured to the base 1 and may be provided with a bearing 45 for the shaft 31. The post 44 is so positioned as to engage the rear end of the headstock and if desired also the shaft 10 when the same is moved to vertical position.

It is obvious that when the headstock is moved to the position illustrated in dotted lines in Fig. 1 the work is supported in a horizontal position in which the successive layers of the work may be readily and conveniently built up and glued and as each course is finished the headstock can be swung to its normal position to enable the same to be faced by the lathe tool, or other suitable operation to be performed upon it.

It is also obvious that the work may be arrested in any inclined position and that overhead drills and other tools may be employed to perform their operations upon the work either when it is in horizontal, inclined or vertical positions as may be desired.

A further object of the invention is to provide a suitable tool support which will enable the tool to be presented properly to any portion of the work and which will also permit the tool, with the mechanism upon which it is supported, to be swung out of the path of the work when the work is moved from normal vertical position to horizontal or inclined position as above described.

As illustrated in the accompanying drawings the tool-supporting means comprises a lower section 46 located considerably to one side of the vertical plane of the axis of the shaft 10 and having an enlarged base portion which is secured to the base 1 provided with an annular flat surface 47 and a central post 48 and an offset pedestal section 49 which is pivotally mounted upon the post 48. The pivotal portion of the offset section desirably is constructed in two complementary parts fitting the vertical post 48 and having flanges secured together by suitable bolts 50. The pivotal portion of the offset column section desirably is provided with a flange 51 having a lower surfaced face engaging the surfaced face 47 of the pedestal section 46. It desirably is also provided with an arcuate slot 52 through which a clamping screw 53 extends into the pedestal section 46 thereby permitting the pivoted pedestal section 49 to be secured in adjusted positions.

The offset pedestal section 49 desirably is in the form of an inverted gooseneck and its free end is provided with an enlarged circular flange portion 54 having a flat surfaced upper face and a central cylindrical socket 55. A long carriage slide 56 is pivotally mounted upon the upper end of the pivoted pedestal section 49. In the construction shown the carriage slide 56 is provided with a circular, preferably integral, boss 57 having a surfaced under face which engages the face of the circular upper end of the pedestal section 49 and is also provided with a central cylindrical boss which fits into the socket 55 and provides a pivotal connection between the carriage on the pedestal.

The carriage slide is adjustably secured to the pedestal by bolts 58 seated in slots (not shown) concentric with the pivotal axis of the boss 57. The carriage slide 56 is provided with a usual rack 59 adapted to be engaged by a suitable gear upon the carriage 60 which is mounted upon it and operated by the usual hand wheel 61. The carriage 60 is provided with an upwardly extending cylindrical boss 62 which engages a suitable socket in a cross slide support 63 and suitable means, such as a clamping screw 64, are provided for locking the cross slide support in adjusted position. The cross slide 65 is reciprocably mounted upon the support 63 and is moved longitudinally thereof by a screw 66 having a hand wheel 67. The tool post 68 is adjustably secured in a slot in the tool slide 65 and the tool 69 is clamped in the tool post in the usual manner. By reason of this construction the gooseneck section 49 of the pedestal may be adjusted in any desired position and clamped therein by the screw 53.

The carriage slide 56 may be adjustably secured in any desired position either in parallelism with the work, as illustrated in Fig. 2, or in angular relation thereto. The cross slide may be adjusted about its pivot in such a manner as to present the tool properly to the work and the carriage and also the tool slide may be moved by their respective hand wheels in such a manner as to cause any desired operation of the tool.

Where large pieces of work, such as large built-up patterns, are being turned upon the lathe, and it is desirable that the work shall be swung from normal vertical position to inclined or substantially horizontal position, it is necessary to swing the pivotally mounted section of the tool-supporting pedestal from operative position to a position which will remove the mechanisms supported by it out of the path of the work and when the work is restored to normal position again to reposition the movable tailstock section.

Desirably means are provided for locking the movable section of the tool-supporting means in operative and in inoperative positions. In the present construction the post 48 of the lower pedestal section has a plate 70 secured to its upper end by screws 71. This plate has a portion 72 of larger diameter which overlies the pedestal section 49 and is provided with a hole 73 and also with holes 74, preferably spaced ninety degrees therefrom, to receive a tapered pin 75 which is adapted, after passing through said plate, to enter a complementary tapered hole 76 in the movable pedestal section 49.

The hole 73 is so positioned that when the hole 76 of the pedestal section is in registry therewith and the pin 75 inserted, the movable pedestal section, with the carriages and tool supports carried thereby, will be positioned properly with respect to the work and can be promptly and accurately restored to this position after having been swung aside to permit the vertical swinging movement of the work. When the movable pedestal section 49 is swung sufficiently to cause the tapered hole 76 to register with a hole 74 in the plate, the pin 75 may be inserted and the movable pedestal section locked in inoperative position a sufficient distance away from the work to permit the work to be readily manipulated.

It will be understood that while the invention has been disclosed herein with reference to its embodiment in a wood-working lathe particularly for turning large size patterns, it may also be embodied in other forms of lathes irrespective of size and of the material to be operated upon. It will also be understood that various changes in form, construction and arrangement of parts may be made within the spirit and scope of the claims.

Having thus described the invention, what is claimed as new, and desired to be secured by Letters Patent, is:

1. A lathe for turning large wooden patterns comprising a head stock column formed in superimposed sections, the upper section having a head stock provided with a horizontal shaft provided with a vertical face plate, means for driving said shaft, means pivotally connecting the upper and lower sections of said column, operable to permit the said shaft to be swung from horizontal to vertical position after being disconnected from its driving means, and means for supporting said head stock, when said shaft is in vertical position, to permit free rotation of said face plate and thereby enable the work to be conveniently assembled upon said face plate.

2. A lathe for turning large wooden patterns comprising a head stock column having a short lower section provided with a flat supporting face and a relatively long upper section provided with a complemental face to rest on the supporting face and also provided with a head stock, a horizontal shaft mounted in said head stock provided with a vertical face plate, means for driving said shaft, means pivotally connecting said column sections together at a distance from the work upon said head stock to permit said face plate to be swung away from its normally vertical position to a horizontal position at a convenient height to permit the work to be assembled upon said face plate, and means associated with said faces for positively clamping the sections of said column together when in superimposed relation.

3. A lathe for turning large wooden patterns comprising a head stock column having a short lower section and a relatively long upper section, provided with a head stock, superimposed thereupon, a horizontal shaft mounted in said head stock provided with a vertical face plate, means for driving said shaft, means pivotally connecting said column sections together at a distance from the work upon said head stock, means operative after the shaft has been disconnected from its driving means to swing said face plate away from its normally vertical position to a horizontal position at a convenient height to permit the work to be assembled upon said face plate, and an abutment adapted to be engaged by the end of said shaft when in vertical position to maintain the face plate in horizontal position but permitting free rotation of the face plate while the work is being assembled thereupon.

4. A lathe for turning large wooden patterns comprising a head stock column having a short lower section and a relatively long upper section, provided with a head stock, superimposed thereupon, a horizontal shaft mounted in said head stock provided with a vertical face plate, means for driving said shaft, a pivotal shaft journalled in the lower section of said column at a distance remote from the plane of said face plate, means fixedly securing said pivotal shaft to said upper column section, a gear secured to said pivotal shaft, and means for actuating said gear to swing the head stock shaft from horizontal to vertical position.

5. A lathe for turning large wooden patterns comprising a head stock column having a short lower section and a relatively long upper section, provided with a head stock, superimposed thereupon, a horizontal shaft mounted in said head stock provided with a vertical face plate, means for driving said shaft, a pivotal shaft journalled in said lower column section at a distance remote from the vertical plane of said face plate, means fixedly securing said pivotal shaft to the upper column section, a worm gear secured to said pivotal shaft, a worm engaging said worm gear, means for rotating the shaft of said worm gear to swing said upper column about the axis of said pivotal shaft, and an abutment positioned to engage the lower end of said head stock shaft when in vertical position to support the base plate at a convenient height for assembling the work thereupon and a permit free rotation of said face plate during the assembling of the work.

6. A lathe for turning large wooden patterns comprising a head stock column having a short lower section and a relatively long upper section, provided with a head stock, superimposed thereupon, a horizontal shaft mounted in said head stock provided with a vertical face plate, means for driving said shaft, a pivotal shaft journalled in said lower column section at a distance remote from the vertical plane of said face plate, means fixedly securing said pivotal shaft to the upper column section, a worm gear secured to said pivotal shaft, a worm engaging said worm gear, means for rotating said worm gear shaft to swing said face plate from vertical to horizontal position located out of the path of the work when swung to horizontal position, and means for locking the means for actuating said worm gear shaft operable to retain the work at any desired inclination while permitting free rotation of said face plate.

7. A lathe for turning large wooden patterns comprising a base having a head stock column rising therefrom provided with a short lower section and a relatively long upper section normally superimposed thereupon, and provided with a head stock having a horizontal shaft with a face plate secured thereto normally rotatable in a vertical plane, means pivotally connecting the sections of said column at a point remote from the vertical plane of said face plate to permit the upper section and the face plate to be moved from vertical to horizontal position and to permit free rotation of said face plate while in said horizontal position, a tool supporting pedestal mounted on said base comprising a lower section, located considerably to one side of the vertical plane of the axis of the shaft and out of the path of the work when swung from vertical to horizontal position, and a relatively long offset section pivotally mounted on said base, a carriage slide swivelled on said offset section, whereby the carriage slide may be positioned in any desired relation to the work, or swung out of the path of the work when the latter is moved from vertical to horizontal position, and a carriage mounted on said slide.

8. A lathe for turning large wooden patterns comprising a base having a head stock column rising therefrom provided with a short lower section and a relatively long upper section normally superimposed thereupon, and provided with a head stock having a horizontal shaft with a face plate secured thereto normally rotatable in a vertical plane, means pivotally connecting the sections of said column at a point remote from the vertical plane of said face plate to permit said upper section and the face plate to be moved from vertical to horizontal position and to permit free rotation of said face plate while in said horizontal position, a tool supporting pedestal mounted on said base comprising a lower section located considerably to one side of the vertical plane of the axis of the shaft and out of the path of the work when swung from vertical to horizontal position, a relatively long offset section pivotally mounted on said base, a carriage slide swivelled on said offset section, whereby the carriage slide may be positioned in any desired relation to the work, or swung out of the path of the work when the latter is moved from vertical to horizontal position, a cross slide support swivelled on said carriage, a cross slide mounted on said support with means for actuating the cross slide.

9. A lathe for turning large wooden patterns comprising a base having a head stock column rising therefrom provided with a short lower section and a relatively long upper section normally superimposed thereupon, and provided with a head stock having a horizontal shaft with a face plate secured thereto normally rotatable in a vertical plane, means pivotally connecting the sections of said column to swing about an axis remote from the vertical plane of said face plate to permit the face plate to be moved from vertical to horizontal position and to permit free rotation of said face plate while in said horizontal position, a tool supporting pedestal mounted on said base comprising a lower section, located out of the path of the work when swung from vertical to horizontal position, and a relatively long offset section pivotally mounted on said base, said base having a pit intermediate of said head stock column and said tool supporting pedestal of sufficient depth to permit the turning of work of considerably greater diameter than the distance between the plane of said base and the axis of said head stock shaft, and of sufficient width to permit the work to be swung from vertical to horizontal position, and tool supporting means swivelled upon the end of the offset section of said pedestal operable to permit the tool to be presented to any portion of the work carried by said face plate.

In testimony whereof, I have signed my name to this specification.

CHARLES MacLEOD.